(12) United States Patent
Dean et al.

(10) Patent No.: US 7,131,260 B2
(45) Date of Patent: Nov. 7, 2006

(54) MULTIPLE DETONATION INITIATOR FOR FREQUENCY MULTIPLIED PULSED DETONATION COMBUSTION

(75) Inventors: Anthony John Dean, Scotia, NY (US); Keith Robert McManus, Clifton Park, NY (US); Venkat Eswarlu Tangirala, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 173 days.

(21) Appl. No.: 10/870,898

(22) Filed: Jun. 18, 2004

(65) Prior Publication Data

US 2005/0279078 A1  Dec. 22, 2005

(51) Int. Cl.
*F02C 5/00* (2006.01)
*F02G 1/00* (2006.01)
*F02G 3/00* (2006.01)

(52) U.S. Cl. .................. 60/39.76; 60/39.38; 60/247

(58) Field of Classification Search .................. 60/804, 60/39.37, 722, 247, 39.38, 39.76
See application file for complete search history.

(56) References Cited

U.S. PATENT DOCUMENTS

| 5,557,926 | A | * | 9/1996 | Hunter et al. | .................. 60/247 |
| 5,615,548 | A | * | 4/1997 | Winfree et al. | ............ 60/39.78 |
| 5,845,480 | A | * | 12/1998 | DeFreitas et al. | ............ 60/776 |
| 6,584,761 | B1 | * | 7/2003 | Hunter, Jr. | .................. 60/204 |
| 2004/0123583 | A1 | * | 7/2004 | Nordeen et al. | ........... 60/226.1 |

* cited by examiner

*Primary Examiner*—William H. Rodriguez
(74) *Attorney, Agent, or Firm*—Richard A. DeCristofaro; Patrick K. Patnode

(57) ABSTRACT

The present invention is a pulse detonation combustion system, having a plurality of detonation initiation devices coupled to a main combustion chamber, where each of the detonation initiation devices is operating out-of-phase with each other. Each of the detonation initiation devices assists in the initiation of a detonation in the main combustion chamber, out-of-phase from each other such that the operational frequency of the pulse detonation combustion system is related to the number of detonation initiation devices multiplied by the operational frequency of a single detonation initiation device.

42 Claims, 4 Drawing Sheets

MULTIPLE DETONATION INITIATOR FOR FREQUENCY MULTIPLIED PULSED DETONATION COMBUSTION

This invention was made with government support under Contract No. DABT63-00-C-0001 awarded by DARPA. The government may have certain rights to the invention.

BACKGROUND OF THE INVENTION

This invention relates to pulse detonation engines, and more particularly, to multiple detonation initiators for pulse detonation combustors.

In recent years, efforts to address the need of a combination of combustion systems to obtain a wide range of flight speeds for aircraft have led to the development of pulse detonation combustors, which can be used on aircraft engines (as well as other applications). When used on aircraft engines, pulse detonation engines aid in increasing the available flight speed range of an aircraft engine while reducing the need for a combination of combustion systems.

Pulse detonation combustors create high pressure and temperature detonation waves by combusting a mixture of gas (typically air) and a hydrocarbon fuel. The detonation waves exit the pulse detonation combustor tube as pulses, thus providing thrust. Because of the nature of the operation of pulse detonation combustors (i.e. a series of discrete detonations), there is a limit to the frequencies at which conventional simple tube pulse detonation combustors can operate. This is especially true of tube pulse detonation combustors which use a mixture of air and a hydrocarbon fuel as the detonable component. One of the limitations of hydrocarbon-air mixtures is the relatively long time for run-up to detonation at ambient conditions, with a weak detonation initiation.

However, for a number of reasons, it is desirable to operate pulse detonation combustors at as high a frequency as possible. First, the operation of a pulse detonation combustor at a high frequency minimizes the excitation of the mechanical structure of an engine, or other structure surrounding or supporting the pulse detonation combustor. Operation at low frequencies tends to inflict resonant damage to supporting structure or engines. Second, operation at higher frequencies minimizes the pressure and velocity fluctuations flowing to upstream parts of the flow system, including: inlets, compressors and diffusers.

The present invention addresses the above issues.

SUMMARY OF THE INVENTION

In an embodiment of the invention, a high frequency of detonation is achieved by using a plurality of detonation initiators with a main pulse detonation combustor, where the detonation initiators operate out-of-phase with each other. Each of the initiators operates at a lower frequency than the main pulse detonation combustor, but because they are operating out-of-phase with each other, the operational frequency of the main pulse detonation combustor is increased. In an embodiment, the operational frequency of the main pulse detonation combustor is simply the number of initiators multiplied by the frequency of the initiators.

In an embodiment of the present invention, the initiators themselves are smaller pulse detonation initiators of the tube type, and are placed within the main pulse detonation combustor.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
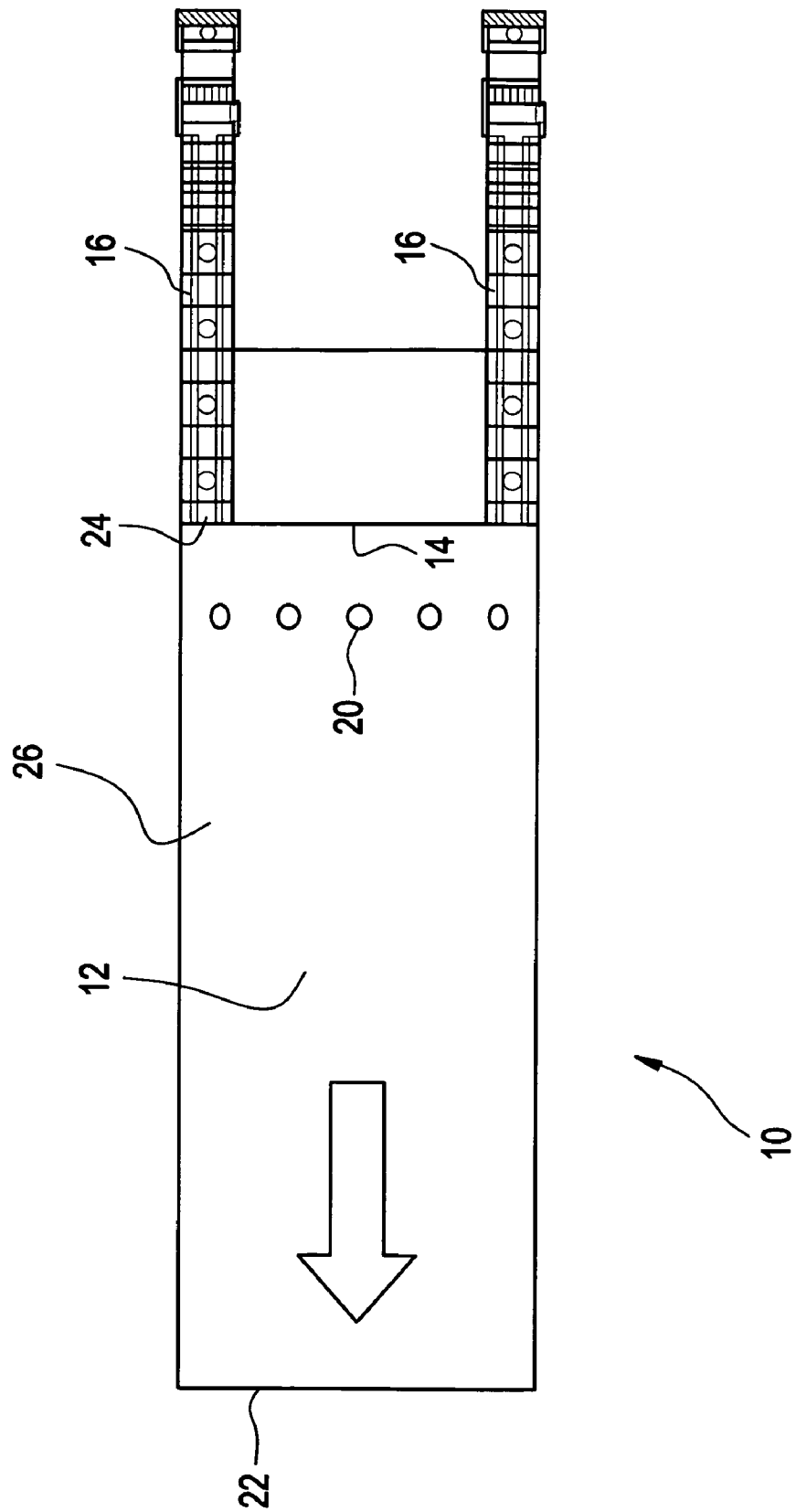
FIG. 1 is a diagrammatical representation of an embodiment of the present invention.
Figure 2:
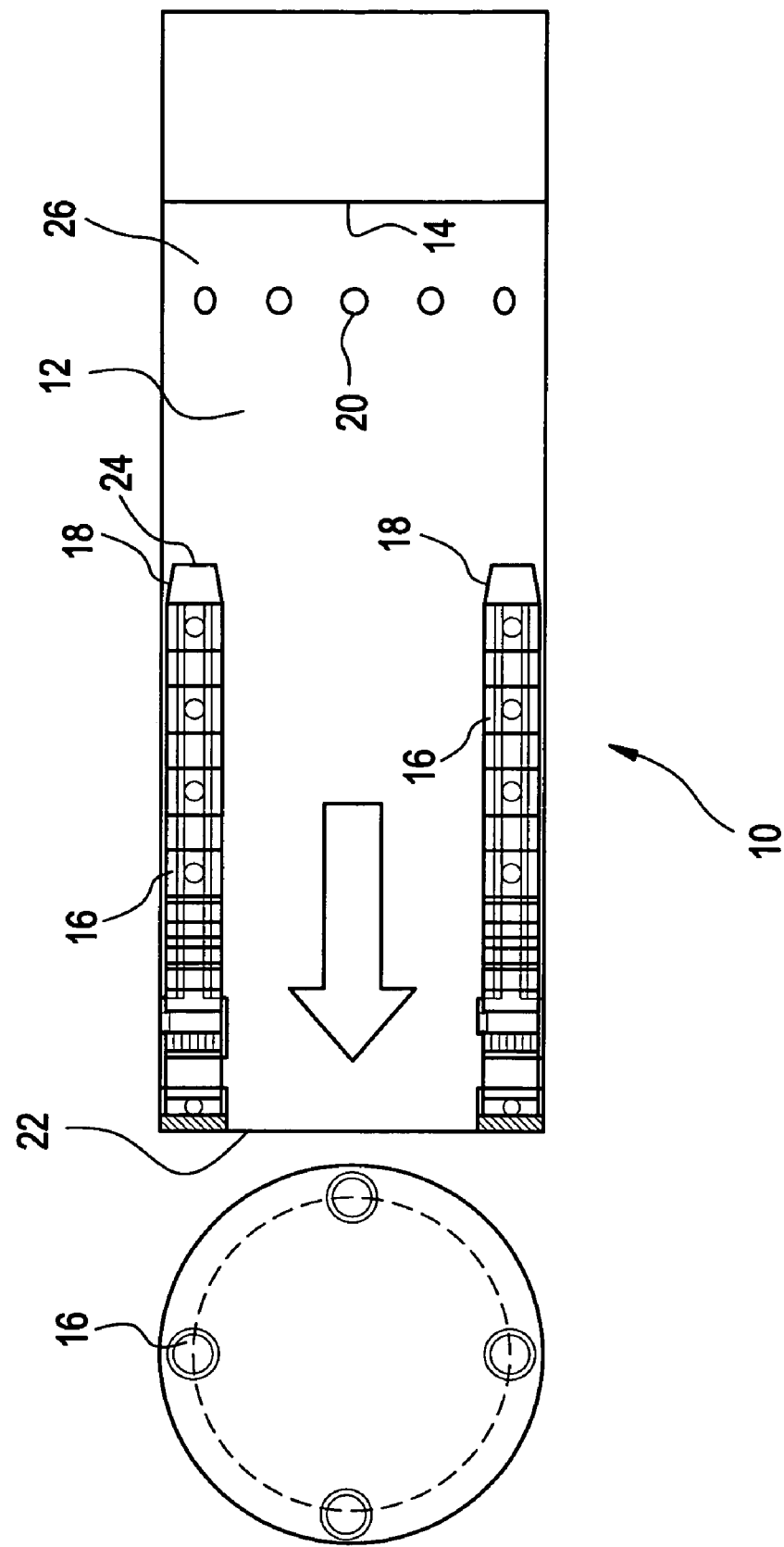
FIG. 2 is a diagrammatical representation of another embodiment of the present invention.
Figure 3:
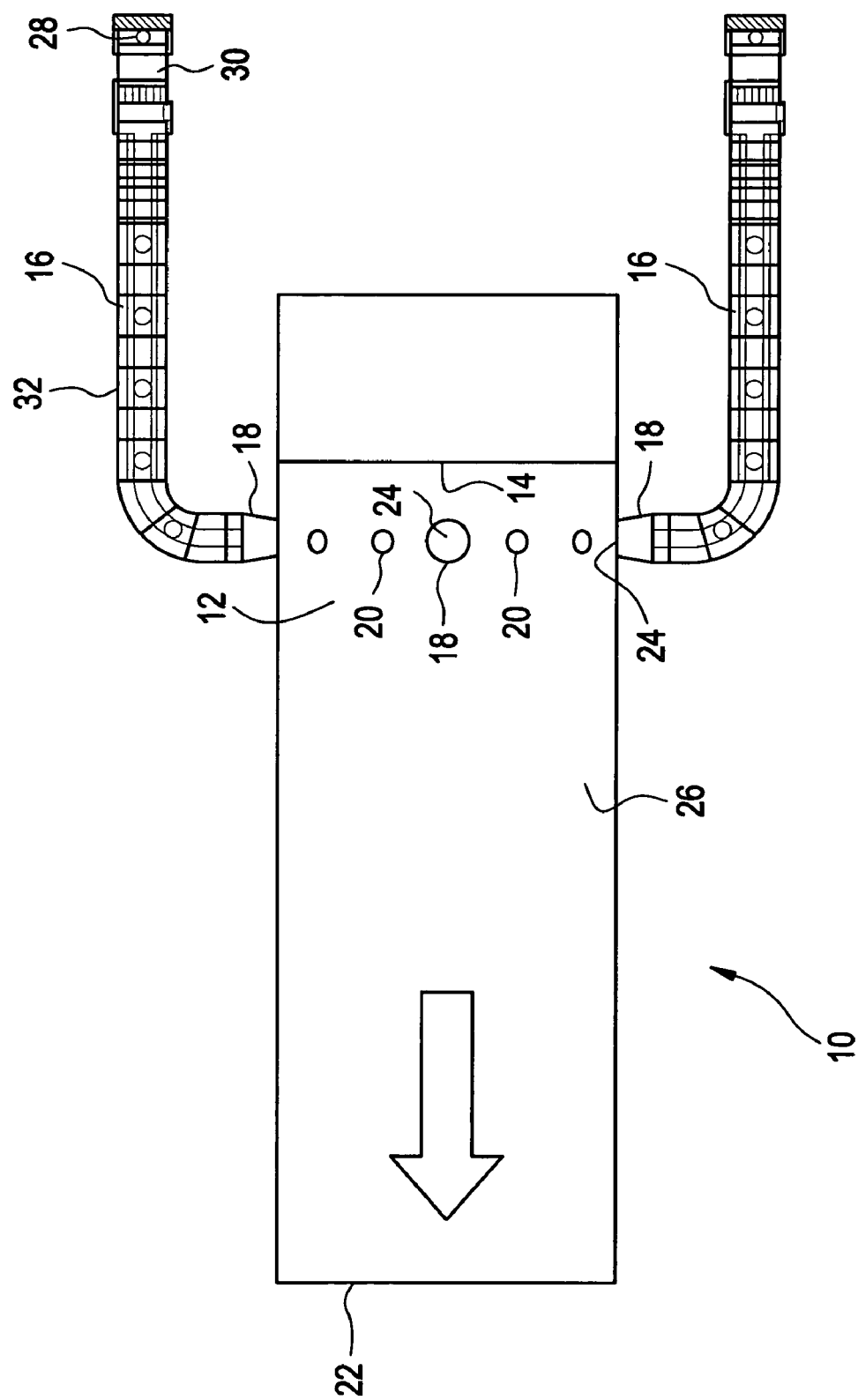
FIG. 3 is a diagrammatical representation of an additional embodiment of the present invention.
Figure 4:
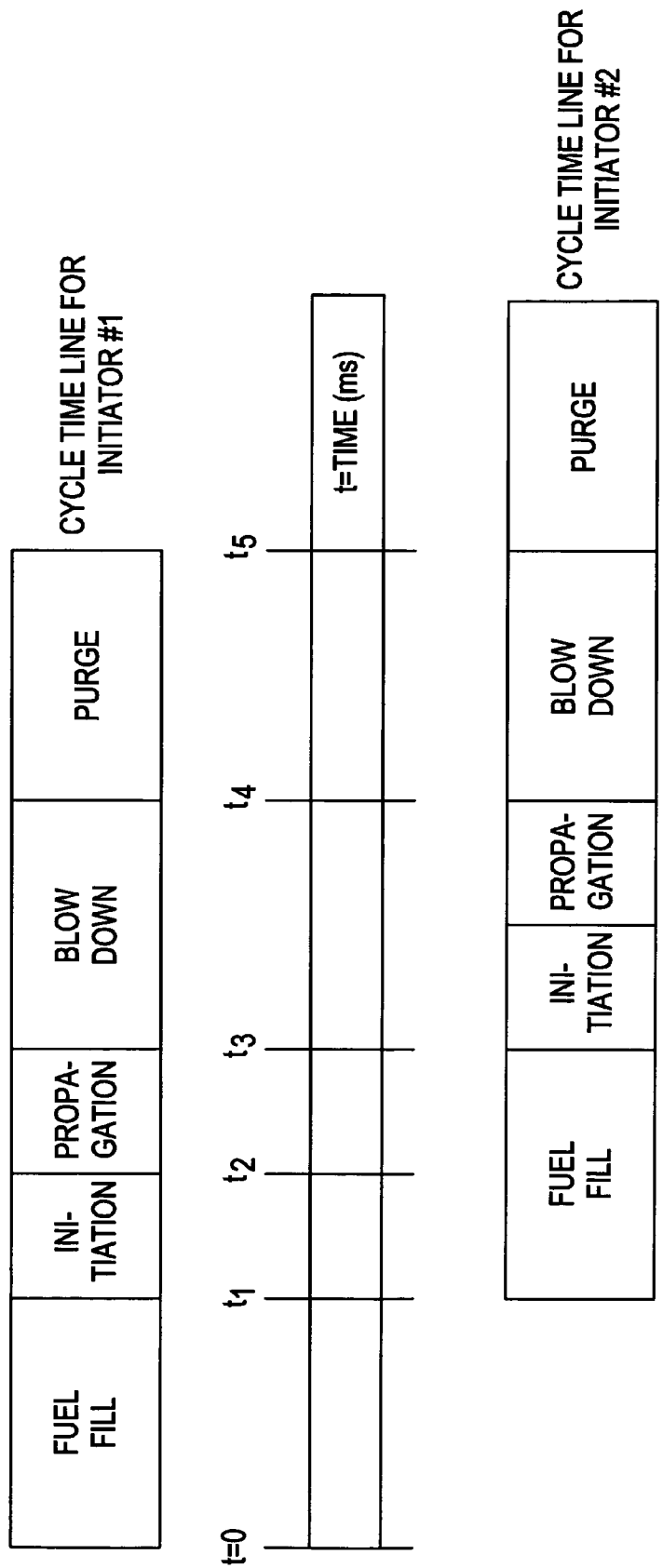
FIG. 4 is a graphical representation of a time line for two initiators in accordance with an embodiment of the present invention.

FIGS. 1–3 are diagrammatical representations of various embodiments of the pulse detonation combustor 10 of the present invention. The pulse detonation combustor 10 contains a main combustion chamber 12, a main combustor resonator surface 14, a plurality of detonation initiators 16, at least one inlet port 20 and a main combustor exit 22. FIG. 4 is a graphical timeline for the operation of an embodiment of the invention.

A detailed discussion of the operation and structure of the pulse detonation combustor 10 is set forth below.

During the operation of the pulse detonation combustor 10 a mixture of a gas, typically air, and a fuel, typically a hydrocarbon fuel, are placed into the main combustion chamber 12, which is cylindrical in shape. The fuel and gas enter the main combustion chamber 12 through the inlet ports 20. In one embodiment, the fuel/gas mixture is pre-mixed, prior to passing through the inlet ports 20 and into the chamber 12. In another embodiment, the fuel and gas enter through specifically designated inlet ports 20 (for example, alternating ports) and the mixing occurs within the chamber 12.

In an additional embodiment, the shape of the main combustion chamber 12 has a shape other than cylindrical. Namely, it is contemplated that the shape of the chamber 12 is rectangular, square, hexagonal, octagonal, or the like, depending on the design and operational requirements of the chamber 12.

The inlet ports 20 are distributed radially around the circumference of the chamber 20, and are spaced evenly. Further, the inlet ports 20 are configured such that the flow from the inlet ports 20 exits the inlet ports 20 perpendicular to the surface 26 of the chamber 12 at the point of entry. Additionally, the inlet ports 20 are located within the same plane with respect to the chamber 12. The number, shape and size of inlet ports 20 are selected based on operational parameters and needs.

In another embodiment, the spacing and distribution of the inlet ports 20 are configured to maximize mixing and performance of the combustor 10. For example, a number of the inlet ports 20 are located in a different plane then the remaining inlet ports 20, and the spacing is asymmetric with respect to the chamber 12. Further, in another embodiment, the inlet ports 20 are angled such that the flow from inlet ports 20 enters the main combustion chamber 12 at an angle different than perpendicular to the surface 26 of the chamber 12 at the point of entry.

Further, the pulse detonation combustor 10 contains a main combustor resonator surface 14 and a plurality of detonation initiators 16. In an embodiment of the present invention, each of the detonation initiators 16 is a tube pulse detonation initiator which operates in a similar fashion as the pulse detonation combustor 10.

In FIGS. 1 through 3, three exemplary embodiments of the present invention are depicted. In FIG. 1 the detonation initiators 16 are located upstream of the main combustion chamber 12 such that the exits 24 of the detonation initiators 16 flow downstream into the main combustion chamber 12 through the surface of the resonator 14. In the FIG. 2 embodiment the detonation initiators 16 are located internally within the main combustion chamber 12 and direct the initiation from the exit 24 upstream into the chamber 12. In the FIG. 3 embodiment the detonation initiators 16 are ducted to the main combustion chamber 12 such that the exit 24 of the initiators 16 are positioned on a surface 26 of the main combustion chamber 12. In this embodiment, the exits 24 are configured such their centerlines are perpendicular to the surface 26 of the chamber 12 at the point of entry into the chamber 12, and the exits 24 are co-planar with respect to the chamber 12. In another embodiment, the initiators 16 and their exits 24 are configured such that the flow exiting the initiators 16 enters the chamber 12 at an angle with respect to the surface 26 of the chamber 12. Further, in another embodiment, some of the exits 24 of the initiators 16 are not co-planar with each other. For example, in a four initiator 16 configuration, two of the initiators 16 are in a first plane of the chamber 12, while the remaining two are in a second plane, which can be downstream or upstream of the first plane.

Further, in each of the exemplary embodiments shown in FIGS. 1 to 3, the exits 24 of the initiators 16 are distributed symmetrically with respect to the chamber 12. However, in another embodiment, the exits 24 of the initiators 16 are distributed asymmetrically, depending on the operational needs and characteristics of the combustor 10.

Moreover, in the exemplary embodiments shown in FIGS. 1 and 2, the initiators 16 are located at an outer radial position with respect to the chamber 12. However, in another embodiment, the radial position of the initiators 16 is located closer to a centerline of the chamber 12. In one embodiment, the plurality of the initiators 16 are symmetrically grouped at a centerline of the chamber 12.

Further, in the exemplary embodiments shown in FIGS. 1 through 3 there are a total of four initiators 16 depicted positioned symmetrically with respect to the chamber 12. However, it is contemplated that the number of initiators 16 varies depending on the desired operation and characteristics of the pulse detonation combustor 10. For example, if the desired operational frequency of the pulse detonation combustor 10 is 400 Hz, and each initiator 16 can operate at 100 Hz, four initiators 16 are used. Further, if the desired operational frequency is 200 Hz, and each initiator 16 operates at 100 Hz, then two initiators 16 are used.

In one embodiment the initiators 16 operate in a frequency range of 20 to 100 Hz. In a further embodiment, the initiators operate at approximately 40 Hz.

The structure and operation of the initiators 16 will now be described. As indicated above, in one embodiment of the present invention, the detonation initiators 16 operate similarly to the pulse detonation combustor 10. Each detonation initiator 16 contains at least one inlet 28 through which a fuel/gas mixture enters a deflagration-to-detonation chamber 30 having a resonator surface (not shown). In one embodiment, the fuel and gas for the initiator 16 is mixed after entering the deflagration-to-detonation chamber 30. In a further embodiment, the fuel/gas mixture is the same fuel/gas mixture employed for the detonation within the main combustion chamber 12 within the combustor 10. Further, each of the initiators 16 contains an initiation source (not shown), which is used to initiate the detonation within the deflagration-to-detonation chamber 30 of the initiators 16. Examples of an initiation source include, but are not limited to, spark or spontaneous detonation.

Additionally, each of the initiators 16 contain an initiator duct 32 which delivers the initiation wave to a nozzle 18 and the initiator exit 24. In one embodiment, the nozzle 18 is a converging nozzle where the area of the exit 24 is less than the area of the initiator duct 32. Further, in an embodiment of the invention, the cross section of the deflagration-to-detonation chamber 30, duct 32, nozzle and exit 24 are circular. However, embodiments are contemplated using alternative cross-sectional geometries, including square, rectangular, oval, hexagonal and the like, depending on the design and operational parameters and requirements. Moreover, in an alternative embodiment, the cross-section of the exit 24 has a different shape than the duct 32 and/or the deflagration-to-detonation chamber 30.

The operation of an embodiment of the pulse detonation combustor 10 is set forth below, and as shown in FIG. 4.

The main combustion chamber 12 is filled with the mixture of fuel and gas to a desired level. Upon reaching this level, one of the detonation initiators 16 initiates detonation of the filled mixture within the main combustion chamber 12. This is accomplished by initiating a detonation within the deflagration-to-detonation chamber 30 of the firing initiator 16. Upon this detonation, a detonation wave travels through the initiator 16 and is passed into the main combustion chamber 12. The high pressure and temperature of the exiting initiation wave initiates the detonation in the main detonation chamber 12. In an alternative embodiment, the detonation in the main chamber 12 is assisted with a secondary initiation device (not shown).

The detonation in the main chamber 12 creates a high temperature and high-pressure wave, at least some of which reflects off of the main combustor resonator surface 14. The detonation wave propagates through the main combustion chamber 12 and exits the pulse detonation combustor 10 at a main combustor exit 22. The shape of the resonator surface 14 is selected for optimal performance of the pulse detonation combustor, and can be of the conical, semicircular, parabolic, flat or rounded shape.

At approximately the same time ($t_1$) the detonation in the main combustion chamber 12 is initiated by one of the detonation initiators 16, the main combustion chamber 12 begins to fill again with a fuel/gas mixture from the inlet ports 20. Thus, at approximately the same time the detonation wave resulting from the first initiation propagates ($t_3$) out of the main combustion chamber 12 the mixture for the second detonation has re-filled the main combustion chamber 12. At this time, a second detonation initiator 16 has initiated detonation of the second fill. At approximately the same time the second initiation begins ($t_3$) the blow down for the first detonation begins. Further, at approximately the same time ($t_4$) the purge from the first detonation begins, the blow down of the second detonation begins, and at approximately the same time ($t_5$) the cycle of the first detonation ends the purge of the second detonation begins.

In an embodiment of the present invention, the cycle time for one complete detonation (from begin fill to end of purge, i.e. t to $t_5$) in the pulse detonation combustor 12 is 10 ms. Thus, with four detonation initiators 16, the pulse detonation combustor 10 operates at 400 Hz.

During operation of the combustor 10 each of the initiators 16 are operated out-of-phase with each other such that for each detonation, within the main chamber 12, only one of the initiators 16 has fired. In an embodiment, the subsequent initiator 16 to fire is adjacent to the previous initiator 16 to fire. However, in another embodiment, non-adjacent initiators 16 are fired sequentially.

In an alternative embodiment, at least two initiators 16 fire at the same time to assist the detonation within the main chamber 12, and these two initiators 16 operate out-of-phase of other pairs of initiators 16. For example, the combustor 10 comprises six initiators 16, and for any given detonation initiation two of the initiators 16 fire.

In one embodiment of the present invention, the cycle timing of the detonation initiation and the pulse detonation combustor 10 is adjustable. In an embodiment, the frequency of operation of the pulse detonation combustor is in the range of 100 to 400 Hz. In an alternative embodiment, the operational frequency of the pulse detonation combustor 10 is adjustable during operation of the combustor 10. As the operational parameters and requirements of the combustor 10 changes during its operation, the frequency of the combustor 10 is changed. Further, as the operational frequency changes, the frequency of the firing of the detonation initiators 16 changes to ensure proper frequency detonation. In an alternative embodiment, the changing of the operational frequency of the combustor 10 is performed automatically by constantly monitoring power and operational characteristics and requirements of the combustor 10, and adjusting the cycling and detonation initiation accordingly.

In an alternative embodiment, each of the nozzles 18 of the initiators 16 are equipped with a valve device (not shown) which closes or narrows when the respective initiator 16 is not firing. The valve device prevents back flow into the initiator 16 from the detonation within the main chamber 12. In another embodiment, the geometry of the exit 24 and/or nozzle 18 of each of the initiators 16 is configured to minimize backflow.

While the invention has been described in terms of various specific embodiments, those skilled in the art will recognize that the invention can be practiced with modification within the spirit and scope of the claims. Namely, although the present invention has been discussed in the context of aircraft engine applications, it is contemplated that the present invention can be employed in all applications which use gas turbine engines, or the like.

What is claimed is:

1. A pulse detonation combustor, comprising:
    a main combustion chamber; and
    a plurality of detonation initiation devices coupled to said main combustion chamber,
wherein at least one of said detonation initiation devices initiates a first detonation within said main combustion chamber out-of-phase with another of said detonation initiation devices initiating a second detonation within said main combustion chamber and wherein at least one of said detonation initiation devices is a pulse detonation combustion device.

2. The pulse detonation combustor of claim 1, wherein all of said detonation initiation devices are pulse detonation combustion devices.

3. The pulse detonation combustor of claim 1, wherein each of said detonation initiation devices operates out-of-phase with the remaining of said detonation initiation devices.

4. The pulse detonation combustor of claim 1, wherein at least one of said detonation initiation devices is located within said main combustion chamber.

5. The pulse detonation combustor of claim 1, wherein a frequency of detonations within said main combustion chamber is within the range of 100 to 400 Hz.

6. The pulse detonation combustor of claim 1, wherein a frequency of detonations within said main combustion chamber is at least 100 Hz.

7. The pulse detonation combustor of claim 1, wherein each of said detonation initiation devices further comprises an exit portion positioned at a surface of said main combustion chamber.

8. The pulse detonation combustor of claim 7, wherein at least one of said exit portions is positioned on said surface such that a flow from said at least one exit portion enters said main combustion chamber perpendicular to said surface.

9. The pulse detonation combustor of claim 1, wherein said plurality of detonation initiation devices are positioned symmetrically with respect to said main combustion chamber.

10. The pulse detonation combustor of claim 1, wherein the operational frequency of each of said detonation initiation devices is in the range of 20 to 100 Hz.

11. The pulse detonation combustor of claim 1, wherein each of said detonation initiation devices comprises a nozzle coupled to said main combustion chamber.

12. The pulse detonation combustor of claim 11, wherein an area of an exit opening of said nozzle is smaller than an area of a detonation chamber within said detonation initiation devices.

13. The pulse detonation combustor of claim 1, wherein said main combustion chamber further comprises at least one input port through which at least one of a fuel and a gas enters said main combustion chamber.

14. The pulse detonation combustor of claim 1, wherein at least two detonation initiation devices initiates said first detonation.

15. The pulse detonation combustor of claim 1, wherein at least one of said detonation initiation devices projects a flow into said main combustion chamber in a downstream direction with respect to said main combustion chamber.

16. The pulse detonation combustor of claim 1, wherein said main combustion chamber has a cylindrical shape.

17. The pulse detonation combustor of claim 1, wherein an exit portion of at least one of said detonation initiation devices has a circular cross-section.

18. The pulse detonation combustor of claim 1, wherein each of said detonation initiation devices comprises an exit portion on a surface of said main combustion chamber and each of said exit portions are co-planar with respect to each other.

19. The pulse detonation combustor of claim 1, wherein said plurality of detonation initiation devices are positioned centrally with respect to a centerline of said main combustion chamber.

20. The pulse detonation combustor of claim 1, wherein a centerline of at least one of said detonation initiation devices is parallel to a centerline of said main combustion chamber.

21. The pulse detonation combustor of claim 1, wherein each of said detonation initiation devices has an operational frequency, and a frequency of detonations within said main combustion chamber is related to said operational frequency multiplied by the number of said detonation initiation devices.

22. The pulse detonation combustor of claim 1, wherein each of said main combustion chamber and said pulse detonation initiator uses a same fuel/gas mixture.

23. A pulse detonation combustor, comprising:
a main combustion chamber; and
a plurality of pulse detonation initiators coupled to said main combustion chamber,
wherein at least one of said pulse detonation initiators initiates a first detonation within said main combustion chamber out-of-phase with another of said pulse detonation initiators initiating a second detonation within said main combustion chamber and wherein each of said pulse detonation initiators operates out-of-phase with the remaining of said pulse detonation initiators.

24. The pulse detonation combustor of claim 23, wherein at least one of said pulse detonation initiators is located within said main combustion chamber.

25. The pulse detonation combustor of claim 23, wherein a frequency of detonations within said main combustion chamber is within the range of 100 to 400 Hz.

26. The pulse detonation combustor of claim 23, wherein a frequency of detonations within said main combustion chamber is at least 100 Hz.

27. The pulse detonation combustor of claim 23, wherein each of said pulse detonation initiators further comprises an exit portion positioned at a surface of said main combustion chamber.

28. The pulse detonation combustor of claim 27, wherein at least one of said exit portions is positioned on said surface such that a flow from said at least one exit portion enters said main combustion chamber perpendicular to said surface.

29. The pulse detonation combustor of claim 23, wherein said plurality of pulse detonation initiators are positioned symmetrically with respect to said main combustion chamber.

30. The pulse detonation combustor of claim 23, wherein the operational frequency of each of said pulse detonation initiators is in the range of 20 to 100 Hz.

31. The pulse detonation combustor of claim 23, wherein each of said pulse detonation initiators comprises a nozzle coupled to said main combustion chamber.

32. The pulse detonation combustor of claim 31, wherein an area of an exit opening of said nozzle is smaller than an area of a detonation chamber within said pulse detonation initiators.

33. The pulse detonation combustor of claim 23, wherein said main combustion chamber further comprises at least one input port through which at least one of a fuel and a gas enters said main combustion chamber.

34. The pulse detonation combustor of claim 23, wherein at least two pulse detonation initiators initiates said first detonation.

35. The pulse detonation combustor of claim 23, wherein at least one of said pulse detonation initiators projects a flow into said main combustion chamber in a downstream direction with respect to said main combustion chamber.

36. The pulse detonation combustor of claim 23, wherein said main combustion chamber has a cylindrical shape.

37. The pulse detonation combustor of claim 23, wherein an exit portion of at least one of said pulse detonation initiators has a circular cross-section.

38. The pulse detonation combustor of claim 23, wherein each of said pulse detonation initiators comprises an exit portion on a surface of said main combustion chamber and each of said exit portions are co-planar with respect to each other.

39. The pulse detonation combustor of claim 23, wherein said plurality of pulse detonation initiators are positioned centrally with respect to a centerline of said main combustion chamber.

40. The pulse detonation combustor of claim 23, wherein a centerline of at least one of said pulse detonation initiators is parallel to a centerline of said main combustion chamber.

41. The pulse detonation combustor of claim 23, wherein each of said pulse detonation initiators has an operational frequency, and a frequency of detonations within said main combustion chamber is related to said operational frequency multiplied by the number of said pulse detonation initiators.

42. The pulse detonation combustor of claim 23, wherein each of said main combustion chamber and said plurality of said pulse detonation initiators use a same fuel/gas mixture.

* * * * *